US008364969B2

(12) United States Patent
King (10) Patent No.: US 8,364,969 B2
(45) Date of Patent: Jan. 29, 2013

(54) PROTECTING PRIVACY OF SHARED PERSONAL INFORMATION

(75) Inventor: Simon P. King, Berkeley, CA (US)

(73) Assignee: Yahoo! Inc., Sunnyvale, CA (US)

( * ) Notice: Subject to any disclaimer, the term of this patent is extended or adjusted under 35 U.S.C. 154(b) by 809 days.

(21) Appl. No.: 12/364,079

(22) Filed: Feb. 2, 2009

(65) Prior Publication Data

US 2010/0199098 A1    Aug. 5, 2010

(51) Int. Cl.
 *G06F 21/00*    (2006.01)
(52) U.S. Cl. ............................................. 713/182; 726/1
(58) Field of Classification Search .................... 713/182
 See application file for complete search history.

(56) References Cited

U.S. PATENT DOCUMENTS

| 6,151,590 | A | * | 11/2000 | Cordery et al. | .................. | 705/60 |
| 7,225,460 | B2 | * | 5/2007 | Barzilai et al. | ..................... | 726/1 |
| 2007/0250704 | A1 | * | 10/2007 | Hallam-Baker | .............. | 713/156 |
| 2009/0300723 | A1 | * | 12/2009 | Nemoy et al. | ..................... | 726/4 |
| 2012/0136936 | A1 | * | 5/2012 | Quintuna | ...................... | 709/204 |

OTHER PUBLICATIONS

Hueniverse: Beginners Guide to OAuth—Part II: Protocol Workflow, http://www.hueniverse.com/hueniverse/2007/10/beginners-gui-1.html, Oct. 15, 2007, Printed Jan. 29, 2009.*
Hueniverse: Beginners Guide to OAuth-Part II: Protocol Workflow, http://www.hueniverse.com/hueniverse/2007/10/beginners-gui-1.html, Oct. 15, 2007, Printed Jan. 29, 2009.*
Hueniverse: Beginners Guide to OAuth-Part II: Protocol Workflow, http://www.hueniverse.com/hueniverse/2007/10/beginners-gui—1.html. Oct. 15, 2007. Printed Jan. 29, 2009.*
Wesabe Privacy Policy, http://www.wesabe.com/page/privacy, printed Jan. 29, 2009.
Fire Eagle, http://fireeagle.yahoo.net/help/userguidelines and http://fireeagle.yahoo.net/help/privacy, Oct. 4, 2007, printed Jan. 29, 2009.
OAuth: Introduction, http://oauth.net/about, , printed Jan. 29, 2009.
Hueniverse: Beginner's Guide to OAuth—Part I: Overview, http://www.hueniverse.com/hueniverse/2007/10/beginners-guide.html, Oct. 4, 2007, Printed Jan. 29, 2009.
Hueniverse: Beginner's Guide to OAuth—Part II: Protocal Workflow, http://www.hueniverse.com/hueniverse/2007/10/beginners-gui-1.html, Oct. 15, 2007, Printed Jan. 29, 2009.
Hueniverse: Beginner's Guide to OAuth—Part III: Security Architecture: http://www.hueniverse.com/hueniverse/2008/10/beginners-guide.html, Oct. 3, 2008, Printed Jan. 29, 2009.
Hueniverse: Beginner's Guide to OAuth—Part IV: Signing Requests, http://www.hueniverse.com/hueniverse/2008/10/beginners-gui-1.html Oct. 8, 2008, printed Jan. 29, 2009.

* cited by examiner

*Primary Examiner* — Kambiz Zand
*Assistant Examiner* — Dant Shaifer Harriman
(74) *Attorney, Agent, or Firm* — Weaver Austin Villeneuve & Sampson LLP (57) ABSTRACT

Methods and apparatus are described to protect personal information by decoupling it from user identity. According to specific embodiments, this is accomplished by associating each user with an anonymous token that is decoupled from the user's identity. Personal information (e.g., a user's physical or geographic location) is stored in association with this anonymous token, with no apparent connection to the user. Those allowed to access the personal information—including the owner himself—are granted the ability through a variety of mechanisms to connect the anonymous token back to the owner. The personal information can then be retrieved by locating the data stored in association with the anonymous token in the data store.

24 Claims, 8 Drawing Sheets

PROTECTING PRIVACY OF SHARED PERSONAL INFORMATION

BACKGROUND OF THE INVENTION

The present invention relates to social networking, and more specifically to protecting the privacy of shared personal information.

Social networking systems allow users to share personal information with each other. Such information can include real names, contact addresses, phone numbers, email and screen names, events, dates, favorite restaurants, recently read books, or personal conversations, among limitless other possibilities.

Recent mobile devices allow users to access such networks from anywhere at anytime. This makes sharing one's physical location with other users particularly attractive. Users in the same vicinity can meet up for a meal, drinks, or a movie. They can tell when a friend is traveling or in a location where she doesn't want to be disturbed. One can ask a friend near a certain store to pick up a needed item. Features such as GPS which automatically determine the mobile device's location make this process effortless for the user.

Providers of social networking systems aggregate vast amounts of personal information about their users. This data is typically stored on servers outside the users' control. Some users may fear the system getting hacked and their personal information stolen. Others worry about the provider sharing their information with marketers or other third parties. Users may only want to give their personal contacts access to their information. These issues can make users reluctant to share their personal information within the social network.

SUMMARY OF THE INVENTION

According to various embodiments of the present invention, a system for sharing personal information in a computer network about a first user associated with a first user device with a second user associated with a second user device is presented. The system comprises one or more data stores configured to store first personal information about the first user in association with a first anonymous token decoupled from the first user's ID. Computing devices in the system implement additional components. An update component receives second personal information about the first user over the computer network and stores the second personal information in association with the first anonymous token. A data sharing component sends one or more of the first or second personal information associated with the first anonymous token to the second user device for display if a key associated with the second user unlocks a connection between the first anonymous token and the first user ID. According to some embodiments, the first and second personal information are stored unencrypted in the data store.

In one class of embodiments, methods, apparatus, and computer program products are provided for sharing personal information in a computer network about a first user associated with a first user device with a second user associated with a second user device. A first anonymous token corresponding to the first user and decoupled from the first user's ID is obtained. First personal information related to the first user is received. The first personal information is stored in association with the first anonymous token. A determination is made whether a key associated with the second user's ID unlocks a connection between the first user ID and the first anonymous token. If the key connects the first user ID to the first anonymous token, the personal information associated with the first anonymous token is sent to the second user device for display.

According to another class of embodiments, a user device is provided for sharing personal information between a first user and a second user in a computer network using an anonymous data store. The user device contains a display device, a computer memory, and one or more processors. The user device is configured to obtain a first anonymous token corresponding to the first user and decoupled from the first user's ID. The user device further obtains a second anonymous token corresponding to the second user and decoupled from the second user's ID. To update the first user's personal information, the user device sends the first anonymous token and first personal information related to the first user to the anonymous data store for storage. To display personal information about the second user, the user device receives second personal information associated with the second anonymous token from the anonymous data store. If it can establish a connection between the second user ID and the second anonymous token, it displays the second personal information in association with the second user ID on the display device.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Users of social networking systems want their personal information secured. This includes preventing unauthorized access to their data from groups such as hackers, third-party affiliates, other users, and perhaps the social networking service itself. One possible method of alleviating user fears is to encrypt their personal data with a key that they don't share with the storage system. This encryption solution prevents others, including the storage system itself, from accessing the data without the user's cooperation. A drawback of this approach is that it interferes with performing data analysis on data across multiple users.

As will be described, the present invention serves to protect personal information by decoupling it from user identity. According to specific embodiments, this is accomplished by associating each user with an anonymous token that is decoupled from the user's identity. Personal information is stored in association with this anonymous token, with no apparent connection to the user. A user may share his personal information with other users (sometimes dubbed contacts) in the network. Those allowed to access the user's personal information—including the user himself—are granted the ability through any of a variety of mechanisms to connect the anonymous token back to the owner. The personal information can then be retrieved by returning the data stored in association with the anonymous token in the data store. This allows retrieval of the owner's personal information without revealing his identity to others.

Since the stored personal information is not tied to identity, some embodiments of the invention store the personal information in the clear (i.e. not encrypted). This protects user privacy while still allowing data analysis to extract useful patterns from the data. The network provider may calculate statistics such as aggregates, averages, distributions, and changes over time in the anonymous stored personal information. This provides a significant advantage over systems which encrypt user data, making such analysis difficult or impossible.

Figure 1:
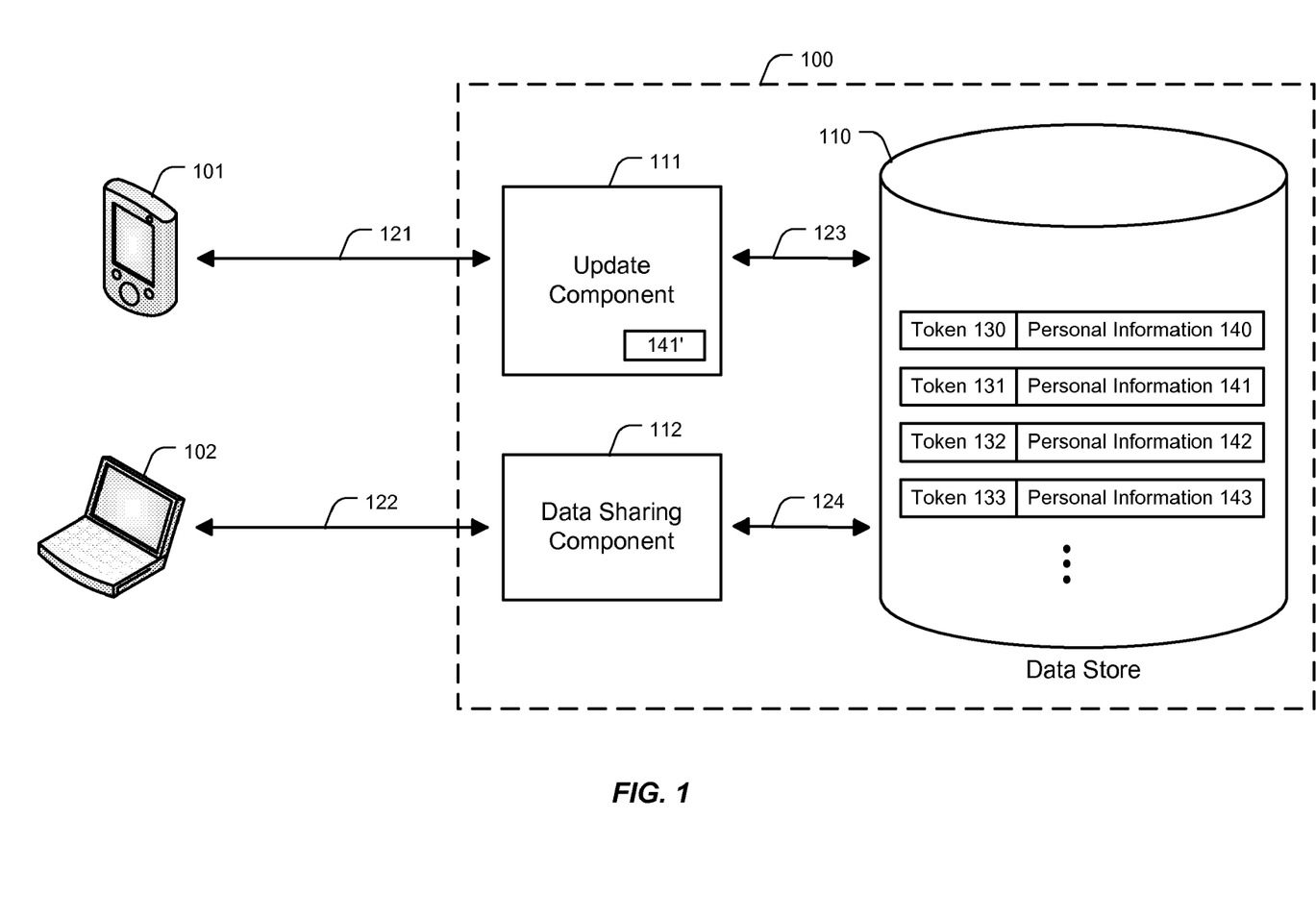
FIG. 1 depicts an example of a data sharing system implemented to protect user privacy in accordance with one or more specific embodiments of the invention

FIG. 1 depicts an example of a data sharing system 100 implemented to protect user privacy in accordance with one or more specific embodiments of the invention. The system has an associated data store 110 which stores anonymous tokens 130-133 in association with personal information 140-143. According to a particular implementation discussed below, this personal information includes a physical or geographic location for a user of the system. However, it should be noted that embodiments of the present invention may be used to protect a wide variety of personal information. For example, users may share their real names, physical addresses, phone numbers, email and screen names, birthdays, work schedule, favorite restaurants, and recently read books, among many other possibilities. As will be understood with reference to the following description, the techniques described herein may be used to protect such information. Therefore, the scope of the present invention should not be limited by references to physical or geographic location information or any other specific kinds of personal information.

Update component 111 communicates with data store 110 over communication link 123 to update the personal information stored with a particular token. For example, the update component might send personal information 141' (e.g., a new physical location for a particular user) to store with anonymous token 131. Data sharing component 112 communicates with data store 110 over communication link 124 to retrieve personal information for a particular token. For instance, the data sharing component may request personal information (e.g., a particular user's physical location) for token 132 and receive personal information 142 in response. This allows a user to share his personal information with other users in the system, e.g., contacts, "friends", "buddies", etc.

End users interact with system 100 through user devices 101 and 102. Device 101 may be associated with a user updating his personal information in the data store. The device communicates the new personal information to the update component 111 over communications link 121. If the user of device 101 corresponds to anonymous token 131, then he might send new personal information 141' to the update component. The update component would then pass personal information 141' to the data store for storage with token 131.

Device 102 may be associated with a second user retrieving personal information about a third user (such as a contact) from the data store. The second user (via device 102) explicitly or implicitly requests the data from the data sharing component 112 over communications link 122. If the second user is allowed to access the third user's personal information, the data sharing component retrieves the information associated with the anonymous token corresponding to the third user from the data store over link 124. For example, if the third user corresponds to anonymous token 133, the data sharing component would retrieve personal information 143 stored with token 133 from the data store and return it to user device 102. This assumes the second user can connect the third user to anonymous token 133, a process which will be explained later.

Data store 110 would usually be implemented as one or more databases, and can reside in or on any storage device from a single memory device such as a hard drive to a cluster of servers. Similarly, components 111 and 112 may reside on the same server implementing data store 110, may both reside on a separate server, may each reside on different servers, or may be split across multiple servers running independently or as a cluster. In some embodiments, these components (or at least a portion of the functionality represented by each) may reside on client devices such as devices 101 and 102. Communications links 121-124 may include any physical or logical medium used for digital communications, including Ethernet, wireless, IDE, SATA, Fibre Channel, and TCP/IP. One skilled in the art will recognize many other possibilities as well.

End user devices 101 and 102 may be any device that can communicate with system 100 and display the results, including desktop computers, laptops, cell phones, PDAs, and netbooks. While FIG. 1 uses two user devices to illustrate users accessing the system in different ways, one skilled in the art will appreciate that most end user devices are capable of both types of access.

Figure 2:
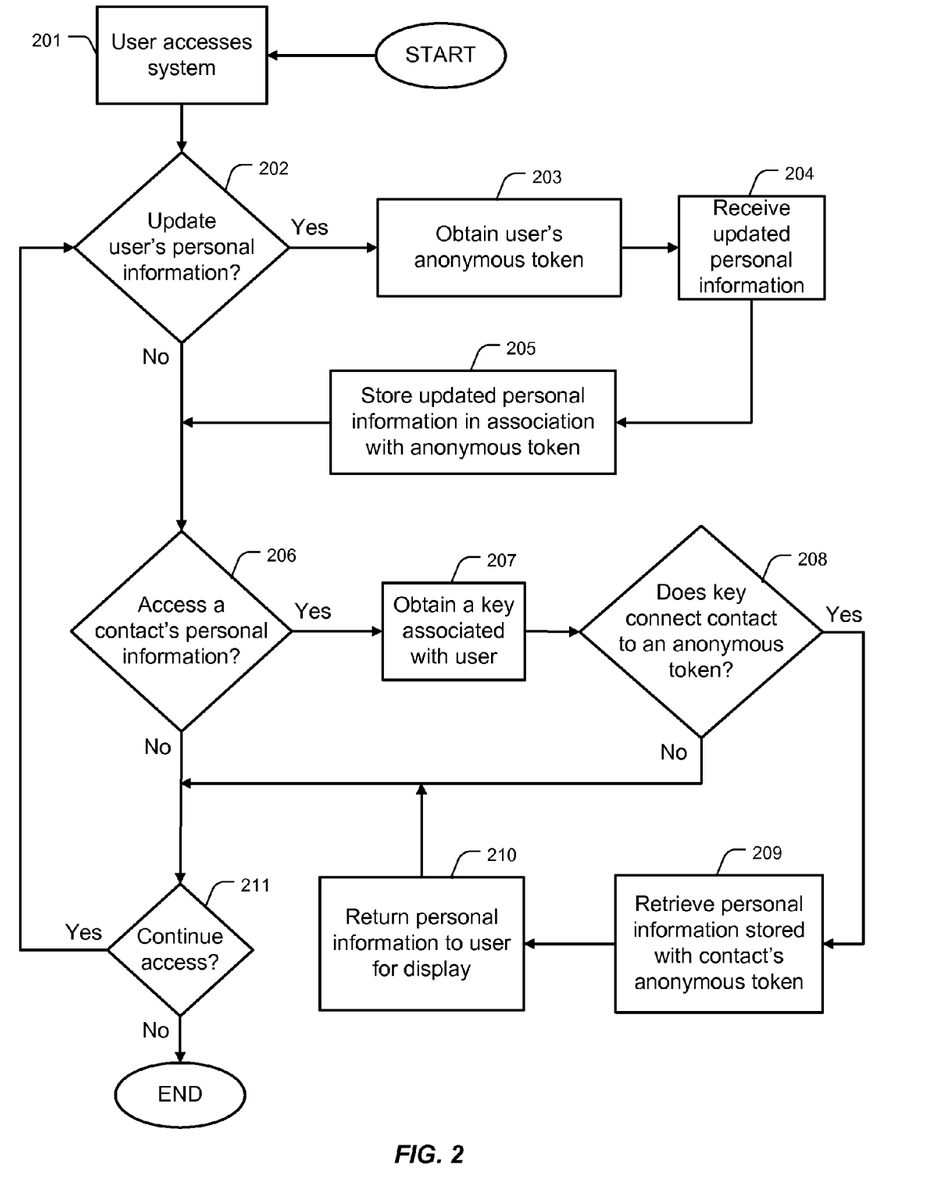
FIG. 2 presents a flowchart illustrating how a user might interact with the system of FIG. 1 according to a specific embodiment of the invention.

FIG. 2 presents a flowchart illustrating how a user might interact with the system of FIG. 1 according to a specific embodiment of the invention. When a user accesses the system (201), the system determines whether the personal information in the data store corresponding to the user should be updated (202). This determination could be made, for example, by examining an explicit request from the user. If the decision results in an affirmative answer, the system obtains an anonymous token corresponding to the user (203). This anonymous token provides a unique index into the data store where this user's personal information is stored. Through the use of the anonymous token, the user's personal information is not tied to the user's identity in any readily discernible way. That is, as will be described, there are one or more levels of indirection between the user's identity and the personal information being protected in accordance with the invention. Someone who gains access to the data store (a hacker, for instance) might be able to read the personal information associated with each anonymous token, but will not easily be able to trace the personal information back to any particular user.

The anonymous token may be obtained, derived, or generated in a variety of ways. For example, it may be a random string generated for the user to which the token corresponds. This string may be stored on the user device, on a component of the system other than the data store, or by a third party. The system can then obtain the token from one of these parties when it is needed. In fact several such token storage systems could be used simultaneously, with the tokens encrypted with the user's login credentials such that they are only available when the user access the system. Alternately, the anonymous token may be derived from credentials such as the user id or a password. In such a case, the derivation could use strong cryptography to prevent recovery of the user id or password from the token. For example, the credentials may be used as input to a one-way hash function such as MD5 or SHA-1, possibly combined with random bitstrings or other data not specific to the user.

The credentials may also be encrypted with a secret key to form the anonymous token, alone or in combination with other data. Encryption algorithms such as DES, AES, and RSA, or any of numerous other algorithms, may be used. The key may be held by the user, e.g., on the user device, derived from a password known to the user, stored by a third party, or held by a component of the system separate from the data store. As another alternative, the user data may be used as a key to encrypt a fixed value, such as the strings "ABCDEFG" or "0101010101010101". These and myriad other possibilities, alone or in combination, will be readily apparent to those skilled in the art. When the system needs an anonymous token formed in any of these ways (e.g., at 203), the token may be stored as above or generated on demand by the user device, a third party, or a component of the system independent of the data store.

Once the system obtains the anonymous token (203), it receives or obtains the new personal information (204). This personal information can come from the user, automatically from the user's device, from a third party, or from the system itself. For example, suppose the new personal information represents the user's current physical location. The user may type his current location into his device, which sends it to the update component. Or if the user is on a mobile device with GPS, the device can send the location information to the system without the user's intervention. If the user connects over a cellular network, the cellular provider may provide the system with the communication tower location nearest the user. Finally, the system might perform a geographic lookup based on the user device's IP address. It will be understood that these are merely some examples of the many possible ways in which this information may be derived.

After obtaining the anonymous token and new personal information, the system stores these data in the data store (205) together. The personal information is tied only to the anonymous token in the data store. That is, the personal information is stored in a manner that decouples the personal information from the identity of the user, since the anonymous token does not directly reveal to which user it corresponds. Someone who wants to access the user's data must first know which anonymous token corresponds to the user. Various mechanisms by which this may be accomplished are described below. Once that token is known, it can be looked up in the data store and the associated personal information retrieved.

After storing the updated personal information (205), or if no personal information is updated (202), the system determines whether to access the personal information of one of the user's contacts (206). The contact may be identified, for example, with reference to any address book or contact list maintained by or associated with the user. Alternatively, a contact may simply refer to another user or entity in the system, i.e., the user and the contact do not necessarily have to have any prior relationship. As when updating personal data, this determination may be made in response to an explicit request from the user. Alternately, the system may decide to access a contact's personal information through other criteria, such as automatically providing location information for contacts on the user's friends list when the user first accesses the system.

If the system decides to access the personal information of one of the user's contacts, the system obtains a key associated with the user (207). The key is a value that is not generally known. For example, it may be a symmetric encryption key or an asymmetric public/private key pair. Alternatively, it need not be an encryption key at all—it may instead be a secret value used as input to a hash or an index into a large data table. Methods for generating and storing such keys are widely known in the art. Among the possibilities, the key can be a random or pseudo-random string of bits, it can be derived from a password, or it can be generated by a key exchange protocol such as Diffie-Hellman. The key may be stored on the client device, stored by a third party, stored by a system component separate from the data store, or derived on demand.

After obtaining the user's key, the system determines whether the key unlocks a connection between the contact and an anonymous token (208). Since the anonymous token by itself does not reveal the owner's identity, this connection cannot be made without the key. That is, the key allows the user to pierce a contact's anonymity and access his personal information. The term "unlock" captures numerous ways to recover information or identify a relationship using a secret value (e.g., an encryption key). One way to accomplish this is to encrypt the contact's identity with the accessing user's key. This encrypted string can then be stored with the contact's anonymous token. Without the key, the encrypted value reveals nothing, keeping the token anonymous. But the user can use his key to decrypt the string and retrieve the contact's identity. In this way, the key connects the contact's identity to her anonymous token. In addition to encryption, "unlock" covers embodiments where no encryption is used. The key may be used as input to a hash algorithm whose output indicates the user's identity, such as indexing into a table of user IDs. Multiple levels of indirection separating the token from the identity are also contemplated. For instance, the user key could decrypt a second key, which is then combined with a system key to decrypt an encrypted user ID stored outside the data store. The term "unlock" encompasses these possibilities as well as others known in the art.

The key in the above example may also be an asymmetric key pair, where the public key is used to encrypt the contact's identity and the private key is used to decrypt it. In this case, since the public key portion may be generally known, it is possible that an adversary could obtain the user's public key and encrypt known contact identities until he finds a value matching the encrypted string. This would compromise the contact's privacy by revealing which anonymous token corresponds to her, even though the adversary does not have the private key to decrypt the string. A variety of techniques are known in the art to prevent such attacks, such as salting the encrypted string with random data. All such methods are contemplated by the invention.

Alternately, the key or key pair may be used to encrypt the contact's anonymous token. The system may then store the encrypted token along with the contact's identity. Anyone reading these stored data would see the contact's name but would be unable to decrypt the anonymous token, thus preventing him from accessing the contact's stored personal information in the data store. With the user key however, the system could decrypt the anonymous token corresponding to the contact.

In another implementation, the key may be used in a hash function instead of encryption. For instance, the system could hash the secret key concatenated with the contact identity, and store the hash value with the anonymous token. Since hash functions are not reversible, retrieving the contact identity from the hash value is not possible. Figuring out which contact the anonymous token belongs to requires knowledge of both the contact identity and the secret key. The user with the key could hash all the contacts in a list until he found the right one, while an adversary without the key could not. Although this method is more computationally intensive than a reversible encryption scheme, it may prove beneficial in situations where processing time is not an issue.

These are but some of the myriad techniques known in the art for cryptographically protecting the relation between two values (the anonymous token and the contact identity). Some such techniques may require more steps, additional levels of indirection, multiple encryptions or hashes, and use of other data, including random and pseudo-random values. The invention contemplates the use of all such techniques.

If the user's key connects the contact identity to an anonymous token, then the personal information stored with the anonymous token is retrieved (209) and sent to the user device for display (210). The information may be returned to the user device in whole or in part, and at different levels of granularity according to the type of information, system settings, or user preferences. For example, suppose the personal information contains a street address representing the user's current physical location, and the user is currently at 701 First Ave, Sunnyvale, Calif., 94089. In some embodiments, the user may specify a level of granularity for each contact: city, zip code, or full address. A contact with a level of granularity of city only sees that the user is in (e.g.) Sunnyvale, Calif. Another with a level of granularity of zip code sees that the user is in the 94089 area. Finally, a contact with access to the full address gets the entire location information. Embodiments are even contemplated in which the level of granularity extends to a particular building or specific location at an address. Similar granularity settings may be applied to other types of personal information.

Referring back to FIG. 2, the process determines whether the user will continue to access the system (211). This could be decided by an explicit request from the user to continue or halt access, a timeout period in which no further communication is received from the client, or in many other ways familiar to those in the art. The determination (211) may also be reached if access to a contact's personal information is not desired (206), or if the user's key does not reveal a connection between the contact and an anonymous token (208). If continuing access is desired, the process may repeat at regular intervals or in response to particular events (202).

Figure 3:
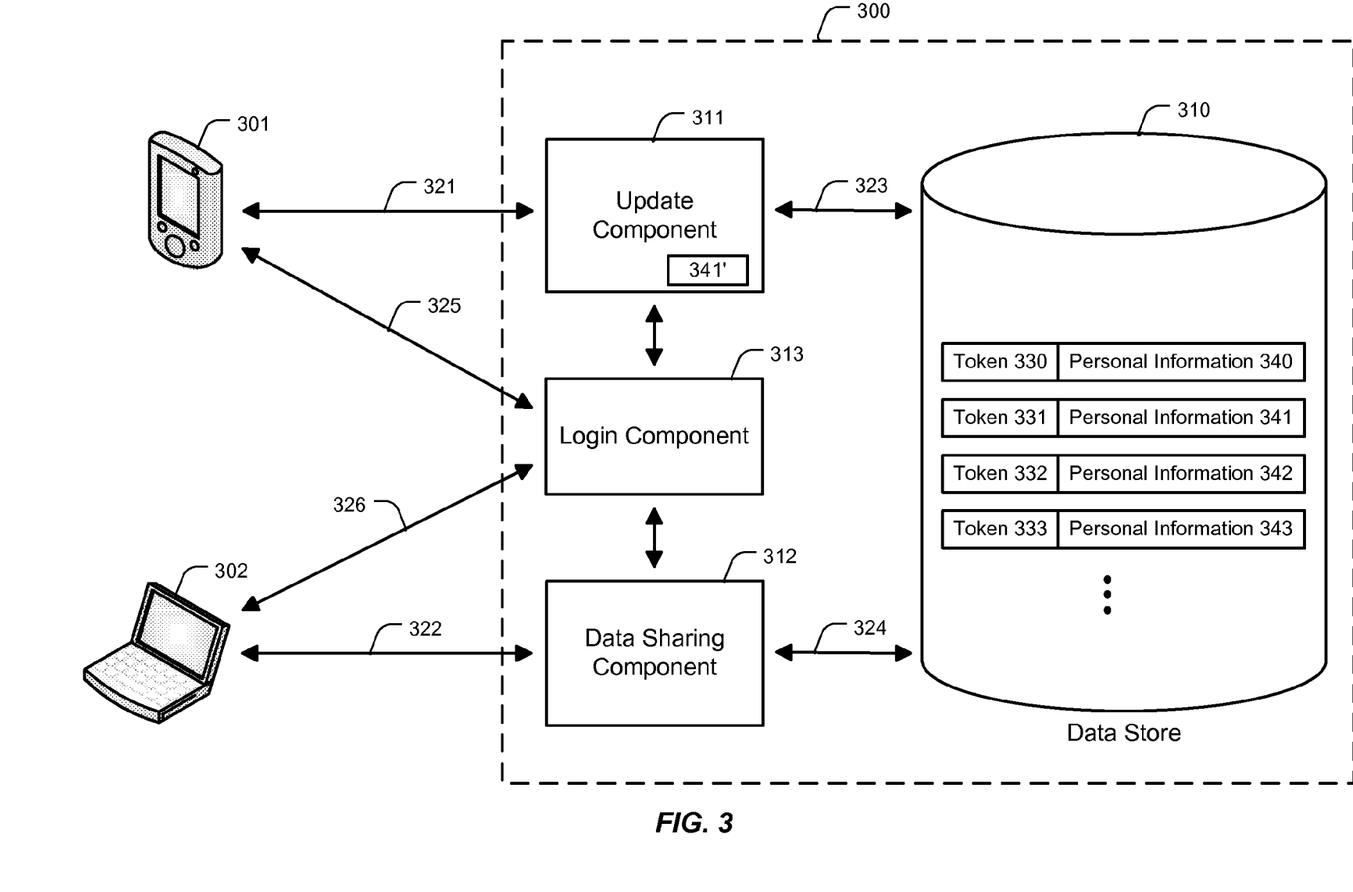
FIG. 3 depicts an embodiment which provides the ability for users to login to the system.

FIG. 3 depicts an embodiment which provides the ability for users to login to the system. User devices 301 and 302 can communicate with login component 313 over links 325 and 326. The user device provides the login component with some form of credentials authorizing the user to access the system. If the credentials pass the login component's verification, the user may then proceed with accessing the rest of the system.

Typically, users would login using the login component before they are allowed to access any other system functions. However, other configurations are possible. The system may only require users to login to update their personal information, but not to retrieve the personal information of others. The system may also grant different levels of access to different login credentials. For example, one user may only be allowed to view personal information but not update any, including his own. Another user may only be allowed to view and update his own personal information but not access that of anyone else. These illustrative examples are not meant to limit the numerous configurations which are possible.

The invention contemplates myriad forms of login credentials. For example, the credentials supplied by the user may include a username and password. They may also include one or more cryptographic keys. The login component may issue a cryptographic challenge to the user device, requiring the device to prove it possesses a particular cryptographic key without revealing the key itself.

The login credentials may be used for more than granting access to the system. For example, the anonymous token may be derived from a password or other credential values as previously described. Similarly, the key used to connect an anonymous token to its owner (e.g., FIG. 2 element 208) may be contained in the credentials or derived from them.

Likewise, the login component may have many possible uses. For example, the login component may derive keys or tokens from various data, including the credentials. These keys or tokens may be returned to the user device and provided to other system components from there. The login component may also retain copies of any keys or tokens while the user is logged in, providing them to update component 311 over link 327 or data sharing component 312 over link 328. Alternately, the login component may generate keys or tokens on demand for other components of the system, possibly maintaining copies of the login credentials while a user is logged in.

User devices 301 and 302 may also communicate with login component 313 indirectly through either update component 311 or data sharing component 312. These communications would occur over links 321 and 327, or 322 and 328, respectively. Some embodiments may lack links 325 or 326, necessitating this alternate communication path. Others may lack links 327 or 328, precluding such communication. Finally, in some embodiments the login component may serve as an intermediary, communicating with one or more other components on the user device's behalf.

Figure 4:
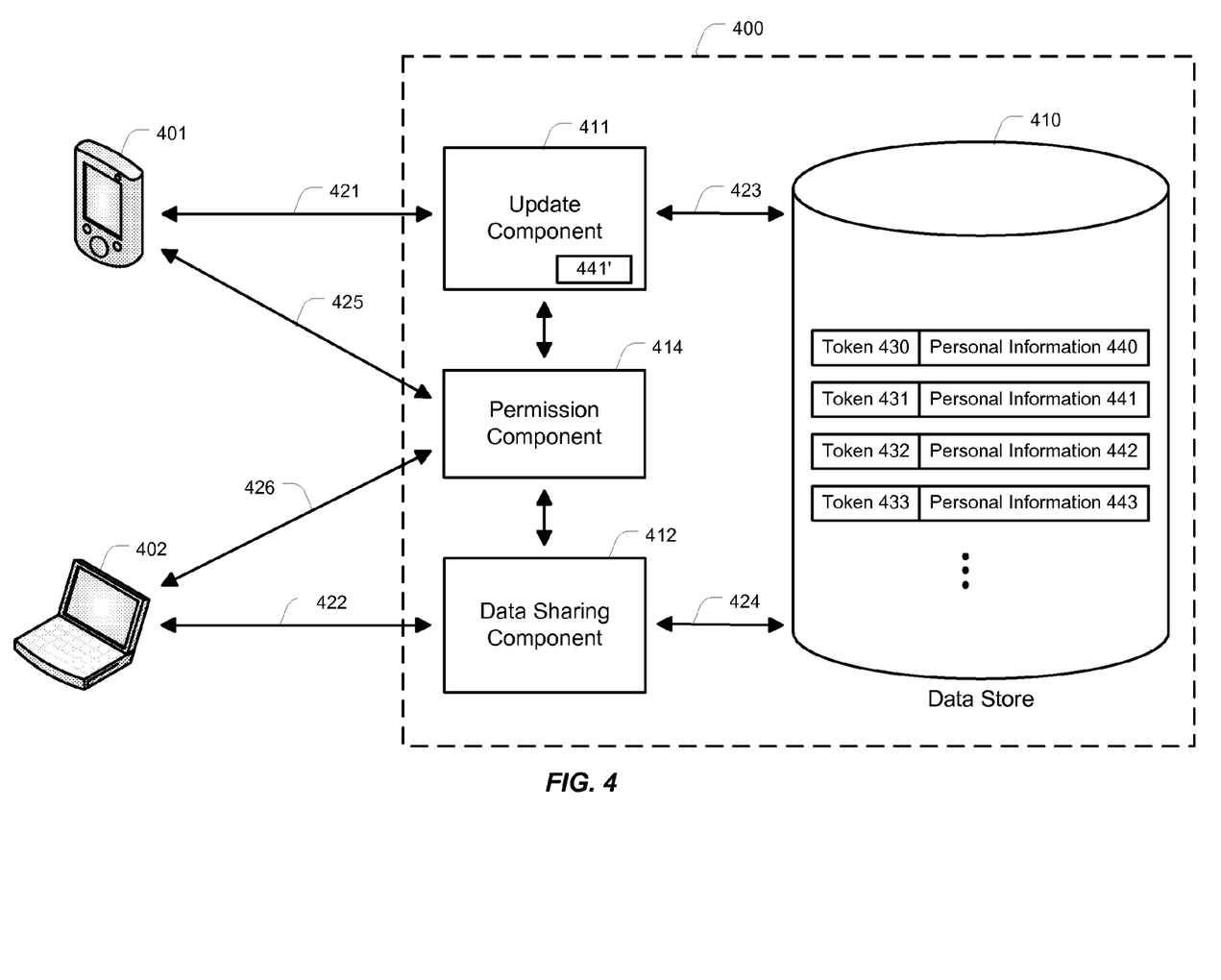
FIG. 4 depicts an embodiment incorporating a component to manage user permissions.

FIG. 4 depicts an embodiment incorporating a component to manage user permissions. The permission component 114 can make decisions about what information a user device is allowed to access. When determining whether a user's key reveals a connection between a contact and an anonymous token, the permission component can retrieve the data representing the connections for that user, perform cryptographic operations with the key on that data, and examine the results for a connection corresponding to the contact. To accomplish this, the permission component typically stores data representing the protected connections for each user of the system, which in some embodiments takes the form of tuples as described below. The permission component typically has access to the user's keys, either by storing a copy of the keys or obtaining them from elsewhere when needed, such as from the login component or the user device. However, in some embodiments the permission component need not access any keys. It can simply store protected connection data which it provides to other components when determining access, including the login component or a client device.

Figure 5:
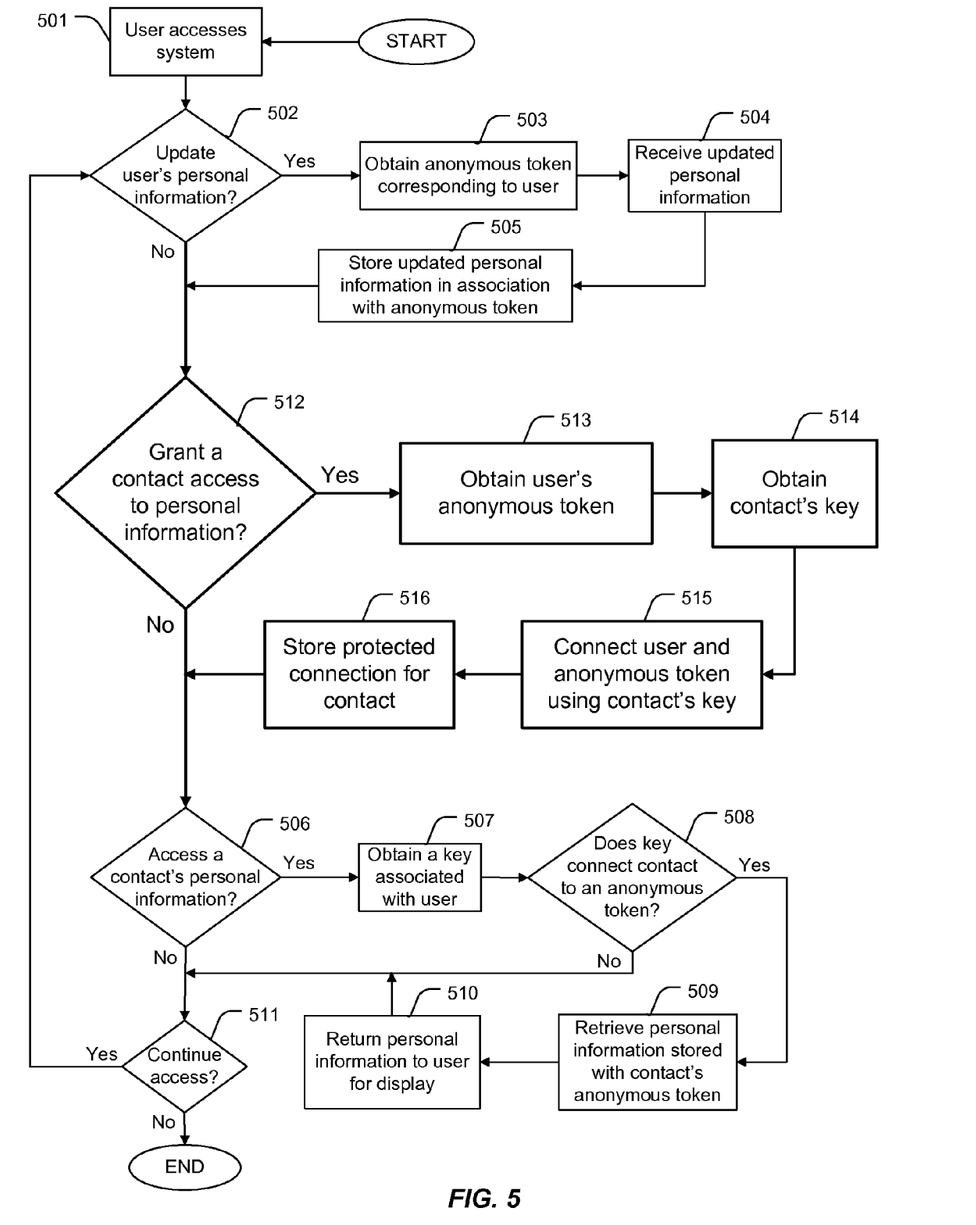
FIG. 5 illustrates the process of granting a contact permission to access a user's personal information.

The permissions component may also grant permission to access a user's personal information, a process illustrated in FIG. 5. When a user accesses the system, an additional step of determining whether to grant permission to a contact (512) is added to the process (500). If such a grant is desired, the permission component obtains the user's anonymous token (513) and the contact's key (514). With these values, the permission component can then protect a connection between the user and the anonymous token with the key. For example, the user id could be encrypted with the key and this encrypted value associated with the anonymous token, forming protected connection data. Finally, the permission component can store this protected connection data associated with the contact's identity for future retrieval.

In some implementations, getting the user's anonymous token is straightforward, since the user is currently accessing the system. However, obtaining the contact's key may prove more difficult. The contact is not necessarily online at the time. His key may be stored on the contact's user device, which may not currently be accessible to the system. The key may be derived from the contact's credentials, which are similarly unavailable. Due to these and other restrictions on the contact's key, it may be preferable to make the key an asymmetric public/private key pair. In such an implementation, the public key would always be available to the system without compromising the contact's anonymity. The public key can be used to encrypt connections that can only be decrypted with the private key. The contact need not share his private key with anyone else in the system (or even the system itself) to grant him access to another user's personal information. A contact's private key may only be needed to decrypt his protected connections data while the contact is accessing the system.

In some embodiments of the invention, the anonymous tokens may be traceable back to the owner in certain circumstances. For example, assume that data representing a user's protected connection is stored as the tuple (user1 id, contact's anonymous token, encrypted contact id). An adversary who sees this tuple can't obtain the contact id directly since it is encrypted. However, if the system also maintains an unprotected contact list showing which contacts a given user has, then an adversary with access to these lists can do the following. First, he can read the user id from the tuple and obtain user1's contact list. This will show him all the contacts user1 has. In many instances, the anonymous token will correspond to one of the contacts on that list, and in some cases may provide a unique id. Otherwise, the adversary can search for other tuples containing the same anonymous token. When he finds another tuple (user2 id, contact's anonymous token, encrypted contact id), he compares the unprotected contact lists for user1 and user2 to see which contacts they have in common. If the result is a single contact, then that contact is the owner of the anonymous token. Otherwise, the adversary can search for another tuple with the same token and repeat the process until he narrows the result to a single contact id.

Figure 6A:
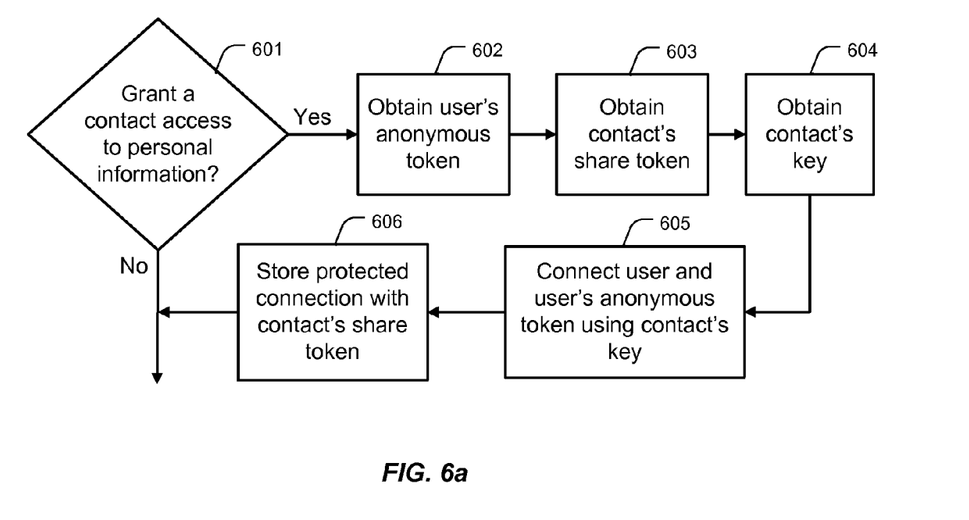
FIG. 6 depicts an embodiment of the invention offering a higher level of anonymity.
Figure 6B:
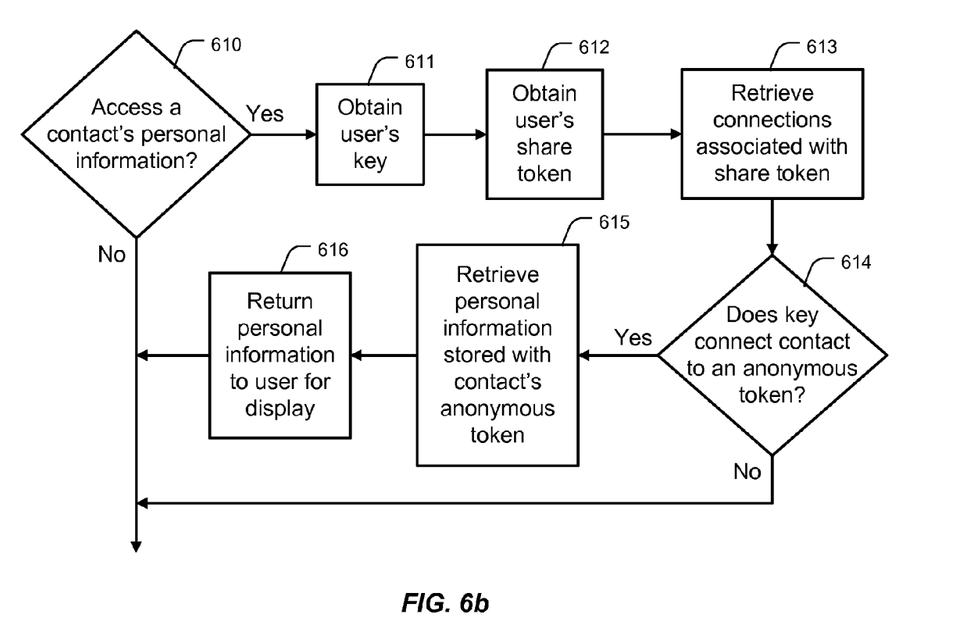

FIG. 6 depicts an embodiment of the invention offering a higher level of anonymity to defeat such attacks. These alternative embodiments for accessing a contact's information and granting a contact access can be combined with any of the processes described elsewhere herein. With the higher level of protection, when a user wishes to grant a contact access to the user's personal information (601), the system obtains the user's anonymous token (602) and the contact's key (604) as before. In addition, the system obtains the contact's share token (603). A share token is simply another kind of anonymous token. It may have the same value as a user's anonymous token, be derived from the same information, or have a completely independent origin. Any of the methods of generating anonymous tokens may be used to create a share token, including random bitstrings. Share tokens can be handled in the same way as anonymous tokens, and either stored or generated on demand. The name "share token" denotes its function of providing more anonymity to the data about shared connections.

Once the system has all three values, it can encode a protected connection between the user's id and the user's anonymous token using the contact's key (605). This process may be done, for example, as described above with reference to FIG. 2. Finally, instead of storing the protected connection data with the contact's id, the connection data is stored with the contact's share token (606). For example, instead of storing the tuple (contact id, user's anonymous token, encrypted user id) the system would store (contact's share token, user's anonymous token, encrypted user id). An adversary with this tuple can't correlate the share token or the anonymous token to any user ids, defeating the contact list attack described above.

When a user wishes to access a contact's personal information (610) under this enhanced scheme, the system obtains the user's key (611) as before. Additionally, the system obtains the user's share token (612). Next the system obtains the protected connections data associated with the share token (613). For example, from all the tuples (share token, anonymous token, encrypted id) stored in the system, this would retrieve the tuples containing the user's share token as the first element. Once these protected connection tuples are retrieved, the process proceeds as before. The user's key is used to determine if any of the protected connections data correlate the contact with an anonymous token (614). If so, the personal information stored with that token is retrieved (615) and returned to the user device for display (616).

Figure 7:
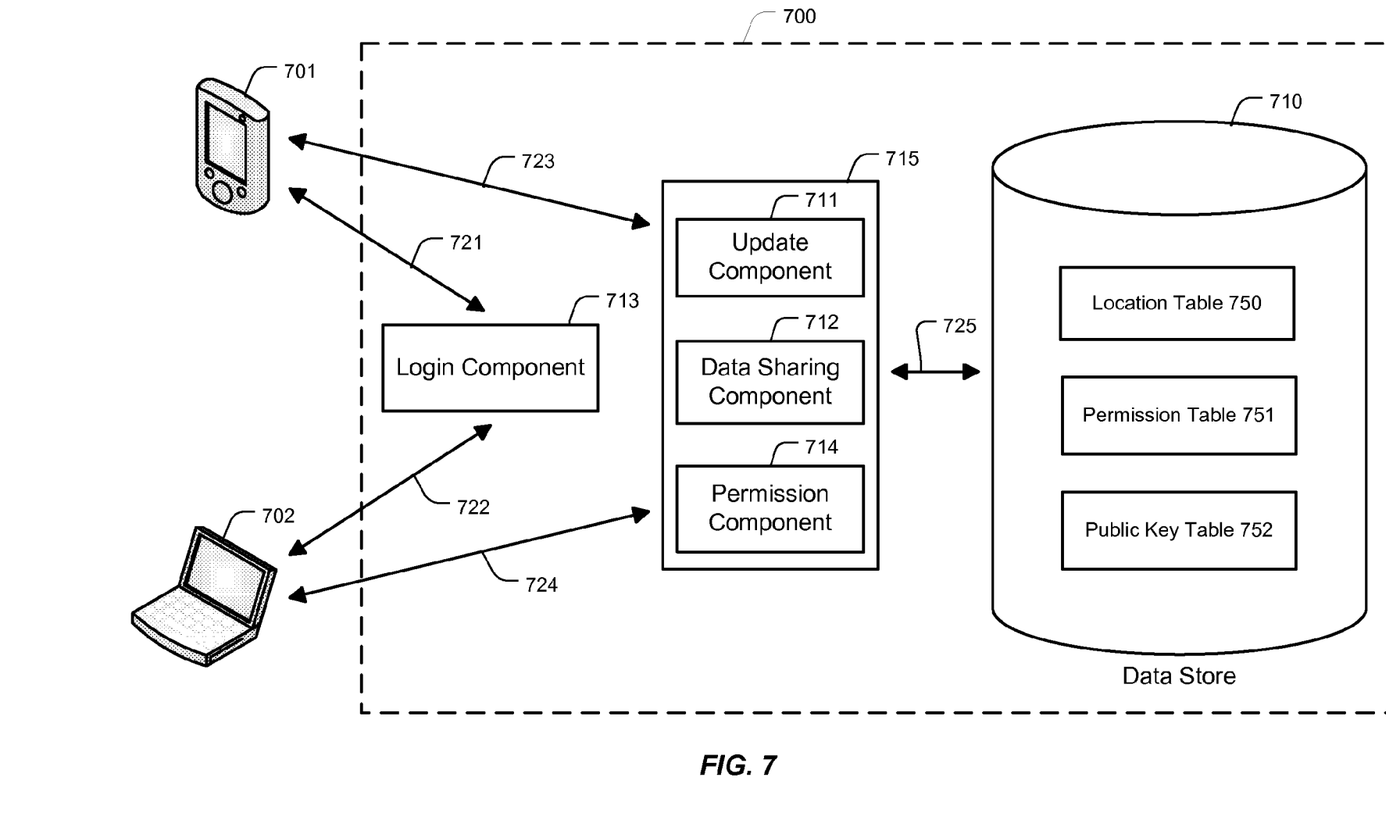
FIG. 7 depicts another specific embodiment of the invention representing a particular combination of various system features and functionalities.

FIG. 7 depicts another specific embodiment of the invention representing a particular combination of various system features and functionalities described elsewhere herein. It should be noted that this example only demonstrates one set of choices from the numerous options previously disclosed, and should therefore not be used to unduly limit the scope of the invention.

System 700 contains a database cluster 710, a server cluster 715, and a server 713. Database cluster 710 implements an anonymous data store containing information about a user's physical location in a location table 750. It also contains a permission table 751 storing protected connections data linking user tokens and user identities. In this example, each user in the system is assigned one pair of asymmetric public/private encryption keys. A public key table 752 maps each user to his corresponding public key. Server cluster 715 implements an update component 711, a data sharing component 712, and a permission component 714. Clustering these components together improves efficiency. Server 713 comprises a login component. Accessing the system are user devices 701 and 702.

According to this embodiment, a client device logs in before using the rest of the system. To do so, device 701 sends login credentials including a user id and a password to login component 713. After the login component verifies the password, it generates the anonymous token and private key for that user. These values are then returned the client device. In this example, the anonymous token is formed by concatenating the user id and password, then taking the SHA-1 hash of that value. The public/private key pair is formed by taking the MD5 hash of the concatenated user id and password, and using this value to seed a pseudo-random number generator which generates the key pair. Any particular user id and password combination always generates the same public and private keys, so the private key doesn't need to be stored between logins. Changing the password generates a new key pair, which requires updating public key table 752 and re-encrypting any protected connections data stored in permission table 751 with the new public key.

After logging in, the user of device 701 may want to update his physical location in the system. Device 701 sends an update request to the update component 711 on server cluster 715. This update request contains the user's anonymous token and his current location. Update component 711 takes this data and updates location table 450 with the new information. Location table 450 is a database table storing tuples of the form (token, location), indexed by token for efficiency. The location data in the entry indexed by the user's anonymous token is replaced with the new location information. Storing a history of past locations is also possible.

User device 701 may grant a contact permission to view the user's location. To do so, device 701 sends the contact's id and the user's anonymous token to the permission component 714 of server cluster 715. The permission component uses the contact id to retrieve the contact's public key from public key table 752, which is a database table of tuples (user id, public key). The contact's public key is then used to encrypt the user id of the user of device 701. Permission table 451 is a database table of tuples (grantee id, grantor anonymous token, encrypted grantor id), where grantor gives grantee the ability to view grantor's location information. Permission component 714 adds an entry (contact id, user's anonymous token, encrypted user id) to permission table 451, allowing contact to view user's location information.

Finally, user device 701 may retrieve the location information of a contact who has granted him permission. User device 701 sends a request for location information to the data sharing component 712 of cluster 715. The request includes the contact id, the user id, and the user's private key. The data sharing component retrieves all tuples from permission table 751 (grantee id, grantor anonymous token, encrypted grantor id) which have the user's id as the first element. These are the protected connections to which the user has been granted access. For each tuple, the permission component uses the user's private key to decrypt the encrypted grantor id. If the grantor id matches the requested contact id, then the permission component has located a protected connection giving the user access to the contact's location information. The permission component then uses the anonymous token from that connection data to retrieve the contact's location information from location table 750. This location information is then returned to client device 701 for display.

Embodiments of the present invention may be employed to facilitate the sharing of user personal information in a protected manner in any of a wide variety of computing contexts. For example, as illustrated in FIG. 8, implementations are contemplated in which the relevant population of users interact with a diverse network environment via any type of computer (e.g., desktop, laptop, tablet, etc.) 802, media computing platforms 803 (e.g., cable and satellite set top boxes and digital video recorders), handheld computing devices (e.g., PDAs) 804, cell phones 806, or any other type of computing or communication platform.

Figure 8:
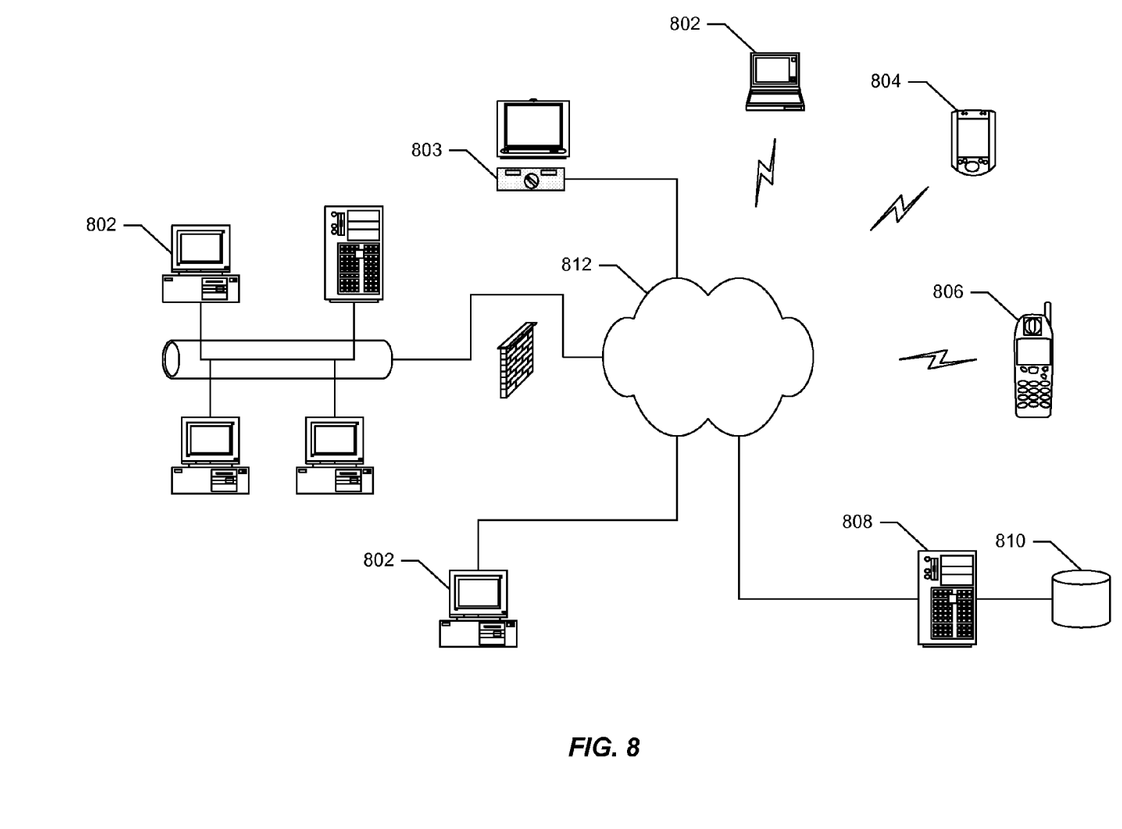
FIG. 8 illustrates computing contexts in which the invention may be practiced.

The various processes and techniques described herein may be facilitated in a centralized manner as represented in FIG. 8 by server 808 and data store 810 which, as will be understood, may correspond to multiple distributed devices and data stores. The invention may also be practiced in a wide variety of network environments including, for example, TCP/IP-based networks, telecommunications networks, wireless networks, etc. These networks, as well as the various social networking sites and communication systems by which personal information may be shared according to the invention are represented by network 812.

In addition, the computer program instructions with which embodiments of the invention are implemented may be stored in any type of tangible computer-readable media (e.g., various types of RAM or ROM), and may be executed according to a variety of computing models including a client/server model, a peer-to-peer model, on a stand-alone computing device, or according to a distributed computing model in which various of the functionalities described herein may be effected or employed at different locations.

While the invention has been particularly shown and described with reference to specific embodiments thereof, it will be understood by those skilled in the art that changes in the form and details of the disclosed embodiments may be made without departing from the spirit or scope of the invention. For example, embodiments of the invention have been described with reference to various system components having specific functionalities. However, it should be understood that the particular system components and groupings of functionalities described are merely for illustrative purposes, and that the basic functionalities of a system designed in accordance with the invention may be distributed among and performed by significantly different sets of system components without departing from the scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A system, comprising:
   one or more data stores configured to store first personal information about a first user in association with a first anonymous token decoupled from a first user ID corresponding to the first user in the system, the first user being associated with a first user device;
   one or more computing devices configured to implement:
      an update component configured to receive second personal information about the first user and store the second personal information in association with the first anonymous token; and
      a data sharing component configured to determine whether a key associated with a second user ID corresponding to a second user unlocks a connection between the first anonymous token and the first user ID such that the second user is allowed to access personal information about the first user, and send one or more of the first or second personal information associated with the first anonymous token to a second user device for display if the key associated with the second user ID corresponding to the second user unlocks the connection between the first anonymous token and the first user ID, the second user being associated with the second user device.

2. The system of claim 1, wherein the first and second personal information are stored unencrypted in the data store.

3. The system of claim 1, wherein the one or more computing devices are further configured to implement a login component, the login component configured to receive a first user ID and credentials from the first user device, and return the first anonymous token to the first user device if the credentials authorize the first user device corresponding to the first user ID to access the system.

4. The system of claim 3, wherein the first credentials comprise a password, and wherein the first anonymous token is derived from the password.

5. The system of claim 3, wherein the first user device communicates with the login component, and the login component is configured to communicate with one or more of the update component, the data sharing component, or the one or more data stores on behalf of the first user device.

6. The system of claim 1 wherein the one or more computing devices are further configured to implement a permissions component, the permissions component being configured to encrypt a connection between the first user ID and the first anonymous token such that the key associated with the second user decrypts the connection between the first anonymous token and the first user ID.

7. The system of claim 6 wherein the one or more computing devices are further configured to implement a privacy enhancing component, the privacy enhancing component being configured to connect a second anonymous token with the second user ID corresponding to the second user, the connection between the second anonymous token and the second user ID being unlocked by the key associated with the second user ID, wherein the permissions component is further configured to associate the second anonymous token with the connection between the first anonymous token and the first user ID.

8. The system of claim 1 wherein the one or more computing devices include the first user device and the update component and data sharing component reside on the first user device.

9. A method, comprising:
obtaining a first anonymous token corresponding to a first user and decoupled from a first user ID corresponding to the first user, the first user being associated with a first user device;
receiving first personal information related to the first user;
storing by a processor the first personal information in association with the first anonymous token in a repository;
determining whether a key associated with a second user ID corresponding to a second user unlocks a connection between the first user ID and the first anonymous token such that the second user is allowed to access personal information about the first user, the second user being associated with a second user device; and
sending the personal information associated with the first anonymous token to the second user device for display if the key connects the first user ID to the first anonymous token.

10. The method of claim 9, wherein the first and second personal information are stored unencrypted in the data store.

11. The method of claim 9, wherein the personal information comprises a name, address, phone number, email name, or screen name.

12. The method of claim 9, wherein the anonymous token is derived from credentials of the first user.

13. The method of claim 9, wherein the personal information comprises a geographic or physical location of the first user.

14. The method of claim 9, further comprising encrypting a connection between the first user ID and the first anonymous token such that the key associated with the second user unlocks the connection between the first anonymous token and the first user ID.

15. The method of claim 14, further comprising associating a second anonymous token with a second user ID corresponding to the second user, the connection between the second anonymous token and the second user ID being unlocked by the key associated with the second user, and associating the second anonymous token with the connection between the first anonymous token and the first user ID.

16. The method of claim 9, further comprising:
returning the first anonymous token to the first user device if first credentials received from the first user device authorize the first user ID to access the system.

17. The method of claim 16, wherein the first credentials comprise a password, and further comprising deriving the first anonymous token from the password.

18. A computer program product including at least one non-transitory computer-readable medium having computer instructions stored therein that, when executed by a processor, cause the processor to perform steps, comprising:
instructions for obtaining a first anonymous token corresponding to a first user and decoupled from a first user ID corresponding to the first user, the first user being associated with a first user device;
instructions for obtaining first personal information related to the first user;
instructions for storing the first personal information in association with the first anonymous token in a content repository;
instructions for determining whether a key associated with a second user ID corresponding to a second user unlocks a connection between the first user ID and the first anonymous token such that the second user is allowed to access personal information about the first user, the second user being associated with a second user device; and
instructions for providing the personal information associated with the first anonymous token to the second user device for display if the key unlocks a connection between the first user ID and the first anonymous token.

19. The computer program product of claim 18, further comprising:
instructions for returning the first anonymous token to the first user device if first credentials received from the first user device authorize the first user ID to access the system.

20. The computer program product of claim 19, wherein the first credentials comprise a first password, and further comprising:
instructions for deriving the first anonymous token from the first password.

21. The computer program product of claim 18, further comprising:
instructions for encrypting a connection between the first user ID and the first anonymous token such that the key associated with the second user unlocks a connection between the first anonymous token and the first user ID.

22. The computer program product of claim 21, further comprising:
instructions for obtaining a second anonymous token associated with the second user ID corresponding to the second user, the connection between the second anonymous token and the second user ID being unlocked by the key associated with the second user, and associating the second anonymous token with the connection between the first anonymous token and the first user ID.

23. A user device, comprising:
a display device;
a memory; and
one or more processors configured to:

obtain a first anonymous token corresponding to a first user and decoupled from a first user ID corresponding to the first user, the first user being associated with a first user device;
receive first personal information related to the first user;
store by a processor the first personal information in association with the first anonymous token in a repository;
determine whether a key associated with a second user ID corresponding to a second user unlocks a connection between the first user ID and the first anonymous token such that the second user is allowed to access personal information about the first user, the second user being associated with a second user device; and
send the personal information associated with the first anonymous token to the second user device for display if the key connects the first user ID to the first anonymous token.

24. The system of claim 1, wherein the second user is a contact or friend of the first user.

* * * * *